(12) United States Patent
Katz et al.

(10) Patent No.: US 7,353,512 B2
(45) Date of Patent: Apr. 1, 2008

(54) MOBILE APPLICATIONS AND CONTENT PROVISIONING USING WEB SERVICES TECHNOLOGY

(75) Inventors: Neil Katz, Parkland, FL (US); James McConnell, Bethlehem, CT (US); Ilan Paleiov, Kfar-Vradim (IL); Roni Ram, Yokneam Illit (IL); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/674,015

(22) Filed: Sep. 29, 2003

(65) Prior Publication Data

US 2005/0071448 A1    Mar. 31, 2005

(51) Int. Cl.
*G06F 9/445* (2006.01)
(52) U.S. Cl. ............... 717/178; 717/174; 717/176; 717/177; 709/200; 709/202
(58) Field of Classification Search ........ 717/168–178; 709/200, 202
See application file for complete search history.

(56) References Cited

U.S. PATENT DOCUMENTS

| | | | | |
|---|---|---|---|---|
| 6,901,429 B2* | 5/2005 | Dowling | ............... | 709/203 |
| 2002/0174117 A1 | 11/2002 | Nykanen | | |
| 2003/0065805 A1* | 4/2003 | Barnes, Jr. | ............... | 709/231 |
| 2003/0084177 A1* | 5/2003 | Mulligan | ............... | 709/230 |
| 2004/0110497 A1* | 6/2004 | Little | ............... | 455/418 |
| 2004/0185877 A1* | 9/2004 | Asthana et al. | ............... | 455/456.6 |
| 2004/0220998 A1* | 11/2004 | Shenfield et al. | ............... | 709/201 |
| 2004/0224674 A1* | 11/2004 | O'Farrell et al. | ............... | 455/418 |
| 2005/0044164 A1* | 2/2005 | O'Farrell et al. | ............... | 709/213 |
| 2005/0071423 A1* | 3/2005 | Rajaniemi | ............... | 709/203 |
| 2006/0020783 A1* | 1/2006 | Fisher | ............... | 713/156 |
| 2006/0155842 A1* | 7/2006 | Yeung et al. | ............... | 709/224 |

OTHER PUBLICATIONS

M. Wagner et al., "A Roadmap to Advanced Personalization of Mobile Services", 2002.*
S. Cheng et al., "A New Framework for Mobile Web Services", 2002.*
D. Hagge, "Dynamic Discovery and Invocation of Web services", Aug. 1, 2001.*
S. Siddiqui, "Deploying Web services with WSDL: Part 1", Nov. 1, 2001.*
B. Siddiqui, "Depolying Web services with WSDL: Part 2: Simple Object Access Protocol (SOAP)", Mar. 1, 2002.*
P. Brittenham et al., "Understanding WSDL in a UDDI registry, Part 1", Sep. 1, 2001.*
P. Brittenham et al., "Understanding WSDL in a UDDI registry, Part 2", Sep. 1, 2001.*
P. Brittenham et al., "Understanding WSDL in a UDDI registry, Part 3", Nov. 1, 2001.*

* cited by examiner

*Primary Examiner*—Meng-Al T. An
*Assistant Examiner*—Lilian Vo

(57) ABSTRACT

A method for provisioning one or more mobile applications. The method including deploying the mobile application as a web service in a UDDI directory, downloading the mobile applications from the UDDI directory by invoking the web service. The method may also include locating the mobile application in the UDDI directory. The method further includes extending a WSDL template to define the mobile application, wherein the extending provides for wrapping the mobile application as the web service, and publishing the WSDL defined mobile application in the UDDI directory.

2 Claims, 2 Drawing Sheets

MOBILE APPLICATIONS AND CONTENT PROVISIONING USING WEB SERVICES TECHNOLOGY

FIELD OF THE INVENTION

The present invention relates to mobile applications in general, and in particular to method and system to provision mobile applications and content.

BACKGROUND OF THE INVENTION

With the rapid development of new mobile applications, and with the coming to market of the next generation of mobile devices, there is an increased need for provisioning systems for mobile applications. For purposes of clarity herein, mobile applications are software applications for use on mobile devices.

Typically, when using an over-the-air or internet option, mobile applications are available at the web sites of mobile service providers. For the mobile device user there are problems with such a system.

As an example, in order to compare and evaluate similar applications, the user must enter each web site of each mobile service provider separately. Additionally, if the user is a subscriber to a first mobile service provider, it is many times not possible to utilize a mobile application from a second mobile service provider. Furthermore, it is the user's responsibility to choose an application which is appropriate for the user's device, and in some instances, depending on the implementation, the user may need to install the application by himself.

Conversely, there are also problems from the independent mobile application provider point of view. When mobile applications are provided by mobile service providers, they are obviously published as options offered by that provider. As such, the back-office facilities, such as accounting, metering, subscription, etc., support the entire site, and subsequently, the back-office facilities for the offered mobile applications are bundled into the rest of the site.

If an independent application provider desires to offer his mobile application as one of the options of a selected mobile service provider, the independent application provider must enter into negations with the mobile service provider for all the back office facilities, or alternatively, he will need to implement for his uses a system that provides all the billing, accounting, logging, monitoring, authorization, etc. services.

Furthermore, the mobile application is only published in the specific website of the selected mobile provider, and in order to publish the mobile application at more sites, the independent application provider must enter into separate agreements with each mobile service provider.

An additionally difficulty for the mobile service provider is the inability to determine if a download operation has ended successfully. Due to the inability to know if the application has been fully downloaded, there may be users which are billed for applications they never received, or visa versa.

It is therefore desirable to find an alternative method for provisioning for mobile applications.

Moreover, currently there is no standard approach to locate and provision a mobile device with a mobile application. Accordingly it would be desirable to provide the ability to standardize the location and provision of mobile applications.

SUMMARY OF THE INVENTION

As a solution to the problems discussed in the Background, this invention proposes to use the web services standards as a means to allow users to locate and provision mobile applications.

As a point of clarity, web services are a standardized way of integrating Web-based applications using the (eXtensible Markup Language) XML, Simple Object Access Protocol (SOAP), web services Description Language (WSDL) and Universal Description, Discovery and Integration (UDDI) open standards over an Internet protocol backbone. Typically, XML is used to tag the data, SOAP is used to transfer the data, WSDL is used for describing the services available and UDDI is used for listing what services are available.

Web services allow different applications from different sources to communicate with each other without time-consuming custom coding. Because all communication is in XML, web services are not tied to any one operating system or programming language. For example, Java can talk with Perl, Windows applications can talk with UNIX applications.

By providing the mobile application as a web service, all the above noted advantages will be provided with the provisioning process of mobile applications. Thus, an advantage of the present invention is the service provider's and enterprise customer's ability to provide easy access and provisioning of mobile applications. The solution allows users to easily find, locate, and install an application on their mobile device.

In addition, through web services, the present invention enables mobile application providers to easily publish their application so it can be located and downloaded to end-user devices.

It is thus provided in accordance with a preferred embodiment of the present invention a method for provisioning one or more mobile applications. The method including deploying the mobile application as a web service in a UDDI directory, downloading the mobile applications from the UDDI directory by invoking the web service. The method may also include locating the mobile application in the UDDI directory.

The method further includes extending a WSDL template to define the mobile application, wherein the extending provides for wrapping the mobile application as the web service, and publishing the WSDL defined mobile application in the UDDI directory. The method may preferably include providing the wrapped mobile application with web service provisions, wherein the provisions include one or more of the following: fully automated application-to-application communication, accounting services, monitoring services, discovery via the UDDI directory, maximized extension flexibility, ability to enable grid services, standard implementation, integration within the enterprises with other web services, and use of the provisioning system for web services.

It is thus provided in accordance with another preferred embodiment of the present invention a method for provisioning one or more mobile applications including receiving information relating to at least one mobile user, according to the information, personalizing a mobile application to support the at least one mobile user, wherein each the personalized mobile application is different for each user, and downloading the personalized mobile application to a mobile device associated with the at least one user. The method may also include stamping the personalized mobile application according to the information relating to at least one mobile user. In an additional embodiment, the method may include receiving at least a user name and password.

In another aspect of the present invention, a computer product readable by a machine is provided, tangibly embodying a program of instructions executable by the machine to perform method steps. The product includes a first code segment operative to deploy a mobile application as a web service in a UDDI directory, and a second code segment operative to download the mobile application from the UDDI directory by invoking the web service. In another aspect, the computer product further includes a third code segment operative to extend a WSDL template to define the mobile application, wherein the extending provides for wrapping the mobile application as the web service, and a fourth code segment operative to publish the WSDL defined mobile application in the UDDI directory. In another aspect, the computer product further includes a fifth code segment operative to locate the mobile application in the UDDI directory.

In another aspect of the present invention, a computer product readable by a machine is provided, tangibly embodying a program of instructions executable by the machine to perform method steps. The product includes a first code segment operative to receive information relating to at least one mobile user, a second code segment operative to, according to the information, personalize a mobile application to support the at least one mobile user, wherein each the personalized mobile application is different for each user, and a third code segment operative to download the personalized mobile application to a mobile device associated with the at least one user. In another aspect, the second code segment is operative to stamp the personalized mobile application according to the information relating to at least one mobile user. In still another aspect, the second code segment is operative to receive at least a user name and password.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
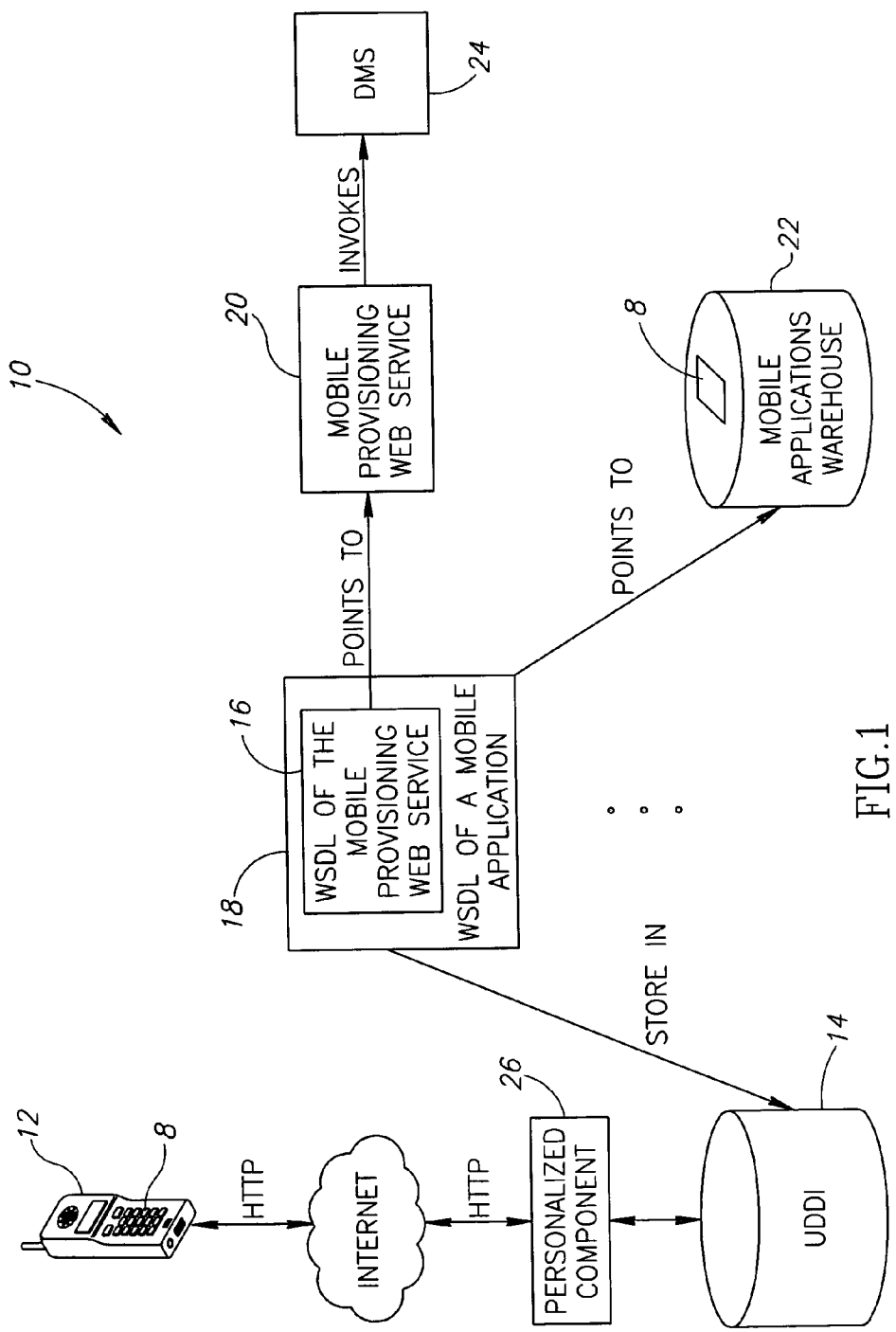
FIG. 1 is a simplified block diagram illustrating a mobile provisioning web service, implemented and operated according to an embodiment of the present invention.

The present invention offers the ability to locate and provision mobile applications into mobile devices by using web services standards. This invention describes a technique to use web services standards such UDDI, WSDL, and SOAP as a means to enable a user to locate and provision a mobile application on a mobile device It is noted that the present invention is dissimilar to the present methodology for locating and provisioning of mobile application, and contrary to the common preconception of a web service.

Unlike traditional client/server models, such as a web server/web page system, web services do not provide the user with a GUI. Web services instead share business logic, data and processes through a programmatic interface across a network. The applications interface, not the users. Web services are used primarily as a means for businesses to communicate with each other and with clients. Web services allow organizations to communicate data without intimate knowledge of each other's IT systems behind the firewall.

Mobile applications, such as a screen savers, customized ring, games or professional specific applications are not traditionally considered web services. Traditionally, web services are services that are not downloaded, rather invoked while connected to the web. As such, while some of the application may sit on the user's machine, for implementation of the full functions provided by the service, the user must stay on line. A service is short term; a question or service is requested and an answer is given.

A mobile application as such is not a service, it is an application. An application, also called end-user programs, include packages such as database programs, word processors, and spreadsheets. Figuratively speaking, applications software sits on top of systems software because it is unable to run without the operating system and system utilities. Applications are downloaded onto the user's computer, and repeatedly implemented. In many applications there is no connection to the internet.

Web services were created and implemented with the aim of providing services. Common practice has not included, nor envisioned, providing an application as a web service.

The present invention's technical aspects for locating and provisioning mobile applications as web services are also contrary to traditional, prior art, technical aspects. When a mobile application is listed at the website of a mobile service provider, the listed item is a GUI that links to a file. The file is the mobile application to be downloaded. The mobile application is stored in the file system at the server side.

Currently, when a user wants to download a mobile application, he goes to the website of the selected mobile service provider. The user, with his mouse or key board, clicks on the GUI of the link which describes the desired mobile application. The mobile application will be downloaded to the device, however, the user may need to install the mobile application on the device.

In contrast, in an embodiment of the present invention, the mobile application is published as a web service in a UDDI directory. The mobile application web service is thus a software application described and defined in the standardized manner of all other web services. The mobile application web service may then be published in the UDDI directory by a set of APIs. The mobile applications may also be stored in a warehouse, or alternatively, in a database, LDAP, etc. A mobile provisioning web service associated with the UDDI directory is responsible for the downloading and installation of the mobile application, thus saving the end user the aggravation of the entire downloading and installation process.

The advantage of this invention is that through an industry standards approach a wide range of mobile applications can be easily deployed, located, and instantiated by end-users. Moreover, the present invention provides a standard implementation and therefore a smooth integration within the enterprises with other web services.

Reference is now made to FIG. 1, a block diagram illustrating the system and operation of mobile application web service 10. Service 10 may be formed of mobile device 12, UDDI 14, a WSDL template 16, a mobile provisioning web service 20, a mobile applications warehouse 22 and DMS 24.

UDDI 14 is a web-based distributed directory that enables businesses to list themselves on the Internet and discover each other, similar to a traditional phone book's yellow and white pages.

In an embodiment of the present invention, WSDL template 16 is a template used to wrap meta data of mobile applications. WSDL template 16 may comprise an XML schema for extending this document to define meta data of mobile applications, abstract definitions, and specific service bindings. The specific service bindings provide multiple scenarios for bindings to the web service. Appendix A details WSDL template 16.

Mobile provisioning web service 20 supplies download capabilities for mobile applications by invoking DMS 24. DMS 24 determines the capabilities of the mobile device 12, and based on these capabilities, the appropriate download mechanism is activated. Mobile applications warehouse 22 may store mobile applications and keep them available for download to end-users.

Figure 2A:
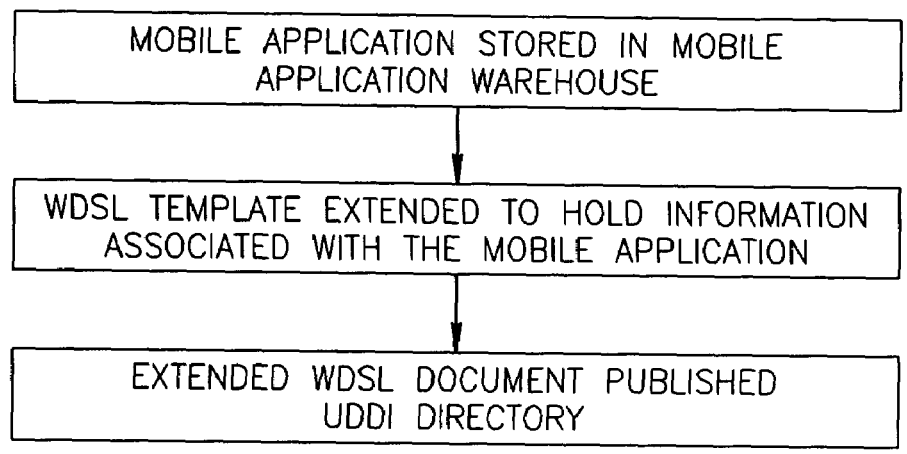
FIGS. 2A and 2B are flow charts illustrating sample implementations of the present invention.
Figure 2B:
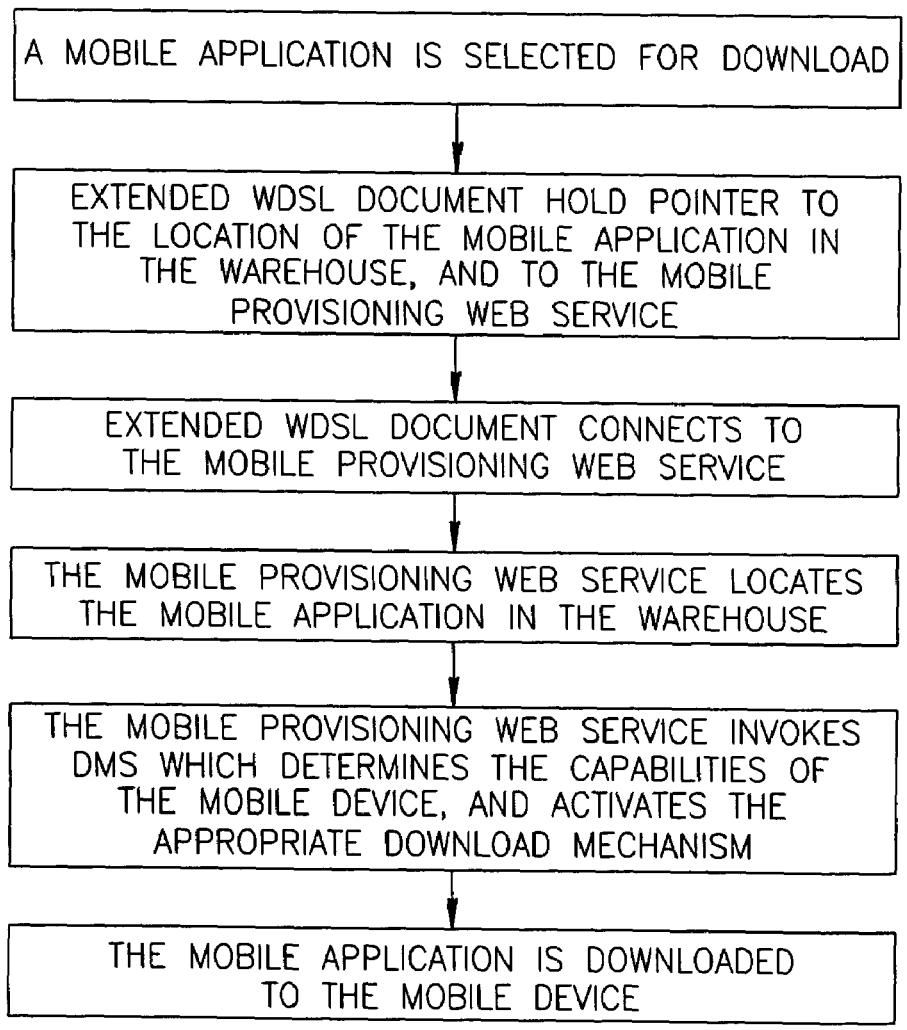

Reference is now made in parallel to FIGS. 2A and 2B, flow charts illustrating sample implementations of the present invention. FIG. 2A is a sample implementation of wrapping and publishing of a mobile application as a web service. FIG. 2B is a sample implementation of downloading a mobile application to a mobile device. FIGS. 2A and 2B are self-explanatory.

Wrapping and Publishing a Mobile Application as a Web Service:

In an sample operation of present invention, an application provider may develop a mobile application 8. The mobile application 8 may be stored in warehouse 22, and thus made available for download to end users.

Preferably the mobile application 8 may then be "wrapped" as a web service. In order to do so, WSDL template 16 is extended by namespaces to hold information associated with the mobile application 8: name, versions, descriptions, location of source files (e.g. exact location in the mobile applications warehouse 22), etc, creating the extended WSDL document 18 of the mobile application 8. Appendix B details the process for creating extended WSDL document 18.

In a preferred embodiment, extended WSDL document 18 thus holds information relevant to the associated mobile application 8. Extended WSDL document 18 may additionally hold the information on accessing and binding to the mobile provisioning web service 20, so as to allow downloading of the mobile application 8 to the mobile device 12.

Extended WSDL document 18 may then be published in UDDI directory 14 as a standard WSDL of a web service. WSDL of mobile applications are saved in the UDDI directory in the same manner as standard WSDL documents.

Downloading a Mobile Application to a Mobile Device:

A mobile application 8 is selected to be downloaded. In a preferred embodiment of the present invention, extended WSDL document 18 of the selected mobile application 8 contains pointers both to the mobile provisioning web service 20 and to the exact location of the mobile application 8 in the mobile applications warehouse 22. In order to download the mobile application 8, the mobile device 12 connects to the mobile provisioning web service 20 using the SOAP protocol for the XML message framework. Mobile provisioning web service 20 uses the pointer from the extended WSDL document 18 to find the mobile application 8 in the mobile applications warehouse 22.

Mobile provisioning web service 20 invokes DMS 24, which determines the capabilities of the mobile device 12, and based on these capabilities, the appropriate download mechanism is activated. Mobile provisioning web service 20, or DMS 24, generates the specific format using the generation elements such as dynamic HTML generator or PRC generator, and using the dynamic information that is received about the device capabilities. As an example, the appropriate generators may be PRC for Palm, dynamic HTML for Siemens, or JAD/JAR for standard J2 ME download agent. The present invention may use device interrogation, and therefore may discover the device capabilities without needing to rely on the static information that the subscriber has registered with. The mobile application 8 is downloaded and installed on the user mobile device 12.

An advantage of the present invention is the ability of application providers to store one instance of the mobile application bundle 8, while the various flavors for the different mobile devices may be generated on the fly by DMS 24.

It is noted that using the UDDI directory for publication of mobile application web services provides the advantage of smooth integration with web services, discovery of mobile applications, complete control over publishing of mobile applications and the ability to exploit extensions of UDDI to support versioning. Use of UDDI directory additionally allows each content provider to publish mobile applications and prevent non-secure access to the service provider's network. Furthermore, since the UDDI implements different kinds of databases, and does not require use of a specific database, the mobile application web service is not dependent on an database provider to provide JDBC or ODBC interface.

Adaptive Download Method

Referring again to FIG. 1 in an alternative embodiment of the present invention, a personalizing component 26 uses user information from device 12 to stamp the code with a personal key to protect the mobile application 8 from being used by non-authorized users. Or alternatively, using the user information, personalizing component 26 may screen or adapt the mobile application 8 to tailor it for the needs of the user. The user information may comprise details such as job title, job description, address, hobbies, interests, etc. Personalizing component 26 may be a servlet, a web service, or any program capable of personalizing mobile application 8. This embodiment is especially useful in instances when the device 12 may be lost or stolen.

The adaptive download method may be defined as follows:

Let:

A—denotes application code f—denotes the generation function

S—denotes the subscriber information for subscriber k

D—denotes the device type i

G—denotes the generated code for device i and provider j k—denotes the secured code key P—denotes the provider j information m(i,j)—denotes the download method for device i and provider j The:

$G(i,j,k) = k(S(k)) * f(A, D(i), P(j))$

Where the generated code is a result of combining a key using the subscriber information and applying the generation function on the application code and the device characteristics, using also provider information.

As a result the code G(i,j,k) that is generated for subscriber k, device i and provider j can be downloaded using the method m(i,j) for device i and provider j.

The method is especially adaptive and flexible. An advantage of the present invention is the freedom to store and maintain only one instance of each mobile application 8, however, each user will receive the mobile application 8 personalized for his use. As an example, the mobile application 8 may process all the patients in a hospital, however, user "Dr. A" will receive only the information concerning his patients. For an extra level of security, to assure that only the actual owner of device 12 receives the appropriate personalized version of mobile application 8, the personalized component 26 may request a user name and password.

In a preferred embodiment of the present invention, the present adaptive download method provides users with the ability to override and add company specific and personalized download methods, as well as generate on the fly the code to be downloaded.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

Appendix A: WSDL Documents for Mobile Provisioning Service

The WSDL documents for the Mobile Provisioning Web Service are as follows:

http://example.com/mobile/MobileProvisioning.xsd

An XML schema for extending WSDL documents to define mobile applications.

```
<?xml version="1.0" encoding="UTF-8"?>
<schema xmlns="http://www.w3.org/2001/XMLSchema">
    <element name="MobileApplication">
    <complexType>
    <sequence>
       <element name="MobileAppVersion" minOccurs="1"
       maxOccurs="unbounded">
       <annotation>
    <documentation>
```

The description field is optional, but should be used if the mobile application has more than one version. It should help distinguish between the different versions of the same mobile application.

```
    </documentation>
       </annotation>
    <complexType>
    <attribute name="id" type="integer" use="required"/>
    <attribute name="description" type="string" use="required"/>
    <attribute name="jadURL" type="anyURI" use="required"/>
    <attribute name="jarURL" type="anyURI" use="required"/>
    </complexType>
       </element>
    </sequence>
    <attribute name="appname" type="string" />
    </complexType>
       </element>
    </schema>
http://example.com/mobile/MobileProvisioning.wsdl
```

Abstract definitions associated with the Mobile Provisioning Web service.

```
<?xml version="1.0" encoding="UTF-8"?>
<definitions name="MobileProvisioning"
   targetNamespace="http://example.com/mobile/definitions"
      xmlns:tns="http://example.com/mobile/definitions"
      xmlns:xsd="http://www.w3.org/2001/XMLSchema"
      xmlns:soap="http://schemas.xmlsoap.org/wsdl/soap/"
      xmlns:soapenc="http://schemas.xmlsoap.org/soap/encoding/"
      xmlns:mobile="http://example.com/mobile/ schemas "
      xmlns="http://schemas.xmlsoap.org/wsdl/">
<import namespace="http://example.com/mobile/schemas"
   location="http://example.com/mobile/MobileProvisioning.xsd"/>
   <message name="downloadRequest">
<part name="arg0" type="xsd:string"/>
<part name="arg1" type="xsd:string"/>
<part name="arg2" type="xsd:string"/>
   </message>
   <message name="downloadResponse">
<part name="return" type="soapenc:Array"/>
   </message>
   <portType name="MobileProvisioningPortType">
<operation name="download">
      <input message="tns:downloadRequest"/>
      <output message="tns:downloadResponse"/>
</operation>
   </portType>
</definitions>
http://example.com/mobile/MobileProvisioningService.wsdl
```

Specific service bindings associated with the Mobile Provisioning Web service.

```
<?xml version="1.0" encoding="UTF-8"?>
<definitions name="MobileProvisioning"
      targetNamespace="http://example.com/mobile/service"
      xmlns:tns="http://example.com/mobile/service"
      xmlns:xsd="http://www.w3.org/2001/XMLSchema"
      xmlns:soap="http://schemas.xmlsoap.org/wsdl/soap/"
      xmlns:soapenc="http://schemas.xmlsoap.org/soap/encoding/"
      xmlns:defs="http://example.com/mobile/definitions"
      xmlns="http://schemas.xmlsoap.org/wsdl/">
<import namespace="http://example.com/mobile/definitions"
   location="http://example.com/mobile/MobileProvisioning.wsdl"/>
   <binding name="MobileProvisioningSoapBinding"
      type="tns:MobileProvisioningPortType">
<soap:binding style="rpc" transport="http://schemas.xmlsoap.org/soap/http"/>
<operation name="download">
      <soap:operation soapAction="" style="rpc"/>
      <input>
<soap:body encodingStyle="http://schemas.xmlsoap.org/soap/encoding/"
   namespace="http://example.com/mobile/MobileProvisioning "
   use="encoded"/>
      </input>
      <output>
<soap:body encodingStyle="http://schemas.xmlsoap.org/soap/encoding/"
   namespace="http://example.com/mobile/MobileProvisioning "
   use="encoded"/>
      </output>
</operation>
   </binding>
   <service name="MobileProvisioning">
<port binding="tns:MobileProvisioningSoapBinding"
      name="MobileProvisioningPort">
      <soap:address location="http://example.com/mobile/
      MobileProvisioning"/>
</port>
   </service>
</definitions>
```

Appendix B: Extended WSDL Documents for Mobile Applications

The extended WSDL documents for the Mobile applications are as follows:

Note: the name of the mobile application to be wrapped as a web service is "Sample" mobile application.

1. Change the names of the WSDL files to Sample.wsdl and SampleService.wsdl (instead of MobileProvisioning.wsdl and MobileProvisioningService.wsdl, respectively).

2. The changes in Sample.wsdl are mentioned in bold:

```
<?xml version="1.0" encoding="UTF-8"?>
  <definitions name="Sample"
....>
    <import namespace="http://example.com/mobile/schemas"
        location="http://example.com/mobile/MobileProvisioning.xsd"/>
    <mobile:MobileApplication name="Sample">
<mobile:MobileAppVersion
    id=1
    description="PalmOS high screen resolutions"
    jadURL="http://example.com/ibm/mobile/PPC.jad"
    jarURL="http://example.com/ibm/mobile/PPC.jar"/>
<mobile:MobileAppVersion
    id=2
    description="PalmOS low screen resolutions"
        jadURL="http://example.com/ibm/mobile/PPC1.jad"
        jarURL="http://example.com/ibm/mobile/PPC1.jar"/>
</mobile:MobileApplication>
<message name="downloadRequest">
....
```

The information about the Sample mobile application includes two versions of the application: The first one is for Palm-OS devices with low screen resolutions. The second one is also for Palm-OS devices, but is for devices with high screen resolutions. The descriptions of each one of the versions can be found in the appropriate JAD files (which their locations is given).

3. The name of the Web service is changed, as is reference to MobileProvisioning.wsdl in SampleService.wsdl document. Assume that the location of Sample.wsdl is http://example.com/ibm/mobile/Sample.wsdl.

The changes in SampleService.wsdl are mentioned in bold:

```
<?xml version="1.0" encoding="UTF-8"?>
<definitions name="Sample"
    ....>
<import namespace="http://example.com/mobile/definitions"
    location="http://example.com/ibm/mobile/Sample.wsdl"/>
....
```

It is noted that other mechanisms of XML, such as Processing Instructors, may also be used to extend the WSDL documents to contain information about a mobile application.

The invention claimed is:

1. A method for provisioning a mobile device with a mobile application, the method comprising the steps of:
   deploying said mobile application as a web service accessible via a Universal Description, Discovery and Integration (UDDI) directory; and
   invoking a mobile provisioning web service responsive to a request for said mobile application web service made using said UDDI directory, thereby causing said mobile application to be downloaded to said mobile device, wherein said step of deploying comprises the steps of:
   extending a web services Description Language (WSDL) template to define said mobile application, wherein said extending provides for wrapping said mobile application as said web service; and
   publishing said WSDL defined mobile application in said UDDI directory.

2. A computer product readable by a machine, tangibly embodying a program of instructions executable by the machine to perform method steps, said product comprising:
   a first code segment operative to deploy a mobile application as a web service accessible via a UDDI directory; and
   a second code segment operative to invoke a mobile provisioning web service responsive to a request for said mobile application web service made using said UDDI directory, thereby causing said mobile application to be downloaded to said mobile device, further comprising:
   a third code segment operative to extend a WSDL template to define said mobile application, wherein said extending provides for wrapping said mobile application as said web service; and
   a fourth code segment operative to publish said WSDL defined mobile application in said UDDI directory.

* * * * *